(12) United States Patent
Stolte et al.

(10) Patent No.: US 8,840,343 B2
(45) Date of Patent: Sep. 23, 2014

(54) METHOD FOR CODING A DRILLING DEVICE

(75) Inventors: Jürgen Stolte, Bad Malente (DE); Wolfgang Gaul, Hamburg (DE); Axel Homann, Hamburg (DE)

(73) Assignee: Airbus Operations GmbH (DE)

( * ) Notice: Subject to any disclaimer, the term of this patent is extended or adjusted under 35 U.S.C. 154(b) by 963 days.

(21) Appl. No.: 12/745,016

(22) PCT Filed: Nov. 29, 2007

(86) PCT No.: PCT/EP2007/063009
§ 371 (c)(1),
(2), (4) Date: Jun. 21, 2010

(87) PCT Pub. No.: WO2009/068096
PCT Pub. Date: Jun. 4, 2009

(65) Prior Publication Data
US 2010/0260564 A1    Oct. 14, 2010

(51) Int. Cl.
*B23B 49/02*    (2006.01)

(52) U.S. Cl.
CPC ............. *B23B 49/02* (2013.01); *B23B 2270/36* (2013.01); *B23B 2240/04* (2013.01)
USPC ....................... 408/1 R; 408/72 B; 408/241 B

(58) Field of Classification Search
CPC .. B23B 49/02; B23B 2240/04; B23B 2270/36
USPC ................... 408/72 B, 115 B, 241 B
IPC ....................................................... B23B 49/02
See application file for complete search history.

(56) References Cited

U.S. PATENT DOCUMENTS

| | | | | | |
|---|---|---|---|---|---|
| 2,490,718 | A | * | 12/1949 | Stellin | 408/241 R |
| 2,915,926 | A | * | 12/1959 | Woerner | 408/241 R |
| 3,756,736 | A | * | 9/1973 | Marcoux | 408/14 |
| 4,589,806 | A | * | 5/1986 | Rotta, Jr. | 408/72 R |
| 4,740,117 | A | * | 4/1988 | Schaff Deleury et al. | 408/72 R |
| 5,372,464 | A | * | 12/1994 | Bureller | 408/72 B |
| 5,701,773 | A | * | 12/1997 | Markisello | 70/465 |
| 7,364,388 | B2 | * | 4/2008 | Faul et al. | 408/115 R |
| 7,437,815 | B2 | * | 10/2008 | Kane et al. | 29/423 |
| 2005/0084344 | A1 | | 4/2005 | Dods et al. | |
| 2010/0040426 | A1 | * | 2/2010 | Pettersson | 408/115 B |

FOREIGN PATENT DOCUMENTS

| | | | |
|---|---|---|---|
| CN | 1374896 A | 10/2002 | |
| DE | 3222037 A1 | 4/1984 | |
| DE | 9109713 U1 | 2/1992 | |
| DE | 4118104 A1 | 11/1992 | |
| DE | 4125501 A1 * | 2/1993 | ............. B23B 47/00 |
| JP | 04-082610 | 3/1992 | |
| RU | 2098236 C1 | 12/1997 | |
| RU | 2104128 C1 | 2/1998 | |
| WO | 0107186 A1 | 2/2001 | |

OTHER PUBLICATIONS http://www.merriam-webster.com/dictionary/linear, online definition of the word "linear", 2014.*

* cited by examiner

*Primary Examiner* — Eric A Gates
(74) *Attorney, Agent, or Firm* — Lerner, David, Littenberg, Krumholz & Mentlik, LLP

(57) ABSTRACT

The present invention relates to a method for coding a drilling device for an aircraft. The method comprises: placing a drilling template with at least a drilling hole on a work piece; placing a drilling bushing in the drilling hole of the drilling template; placing the drilling device in the drilling hole of the drilling template; wherein the drilling bushing comprises a coding master device, in particular a bushing edge; wherein the drilling device comprises a coding sleeve device and wherein the coding sleeve device is adapted for engaging with the coding master device.

7 Claims, 1 Drawing Sheet

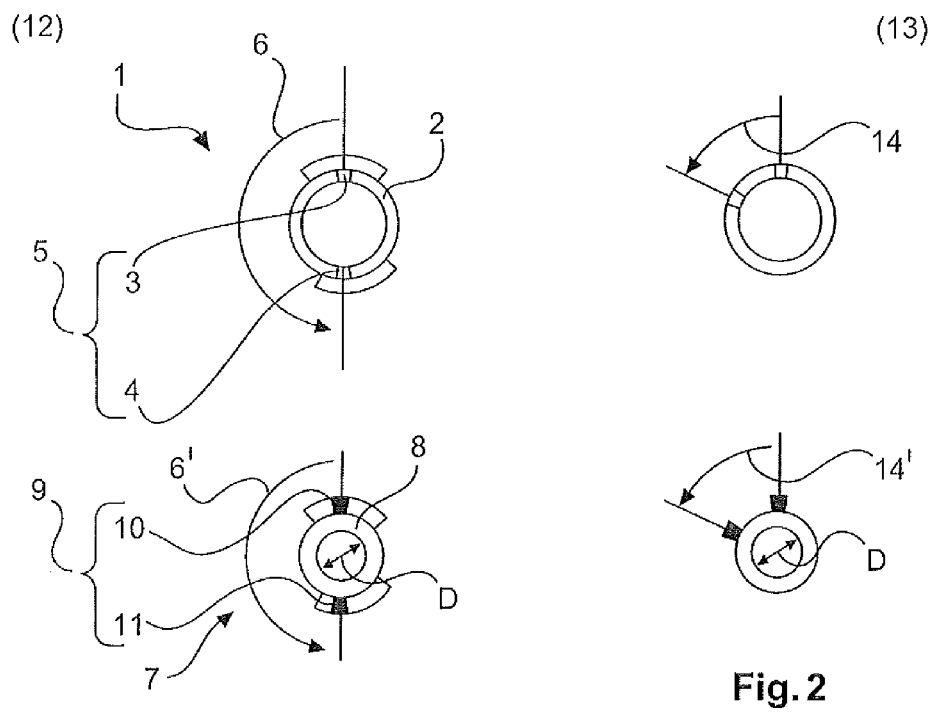

METHOD FOR CODING A DRILLING DEVICE

CROSS-REFERENCE TO RELATED APPLICATIONS

This application is a national phase entry under 35 U.S.C. §371 of International Application No. PCT/EP2007/063009, filed Nov. 29, 2007, published in English, the disclosure of which application is hereby incorporated herein by reference.

TECHNICAL FIELD

The present invention relates to a method for coding a drilling device for an aircraft.

BACKGROUND OF THE INVENTION

Nowadays each wing fuselage connection features a plurality of boreholes for drilling bushings. Due to different curvatures of the wing and fuselage surfaces the bushings and accordingly the boreholes offer different depths. Furthermore the diameter of the borehole, the grip of rivet and the shape of rivet (conical or cylindrical) could differ.

Hence there is some risk that the worker by mistake chooses the wrong drill and thus—drills the wrong borehole.

SUMMARY OF THE INVENTION

It is an object of the invention to provide a coding method, which prevents wrong drills and thus—wrong boreholes.

A method and a device may solve this with the features according to the independent claims.

According to a first exemplary embodiment of the present invention, a coding method for coding a drilling device is provided. The coding method comprises the following. A drilling template with at least a drilling hole is placed on a work piece. This work piece could be selected out of an aircraft for instance. In particular this work piece is part of a wing, a fuselage, a wing box or other components of an aircraft. A drilling bushing is placed in the drilling hole of the drilling template and the drilling device is placed in the drilling hole of the drilling template.

The drilling bushing comprises a coding master device, in particular a bushing edge. The drilling device comprises a coding sleeve device. The coding sleeve device is adapted for engaging with the coding master device.

By applying the exemplary method and embodiment of the invention, the bushing edge comprises a first locking element, a first recess and a second recess. The second recess is spaced to the first recess along to the bushing edge in a predetermined angle. The coding sleeve device comprises a coding sleeve edge which comprises a second locking device, a first coding pin and a second coding pin. The first and the second coding pin are spaced with the predetermined angle. The first locking device is connectable to the second locking element, if the first coding pin engages with the first recess and the second coding pin engages with the second recess.

The drilling template shows with a hole pattern the locations at which has to be drilled. The drilling bushings are placed in the boreholes of the drilling templates. The drilling bushings act as coding master devices in the following way. Preferably the bushings feature a bayonet nut connector (BNC). Additionally, the bushing features two notches on its margin. One of those notches describes the zero point. The other notch is separated from the first notch at a predefined place. The angle between the zero point and the predefined place is therefore also defined and specifies the type of the borehole.

The drilling device acts as a coding slave device, because its function depends from the coding master device. A preferred drilling device, e.g. a drilling machine offers a second BNC, which could engage with the first BNC of the bushing. Additionally, the drilling device offers two coding pins. The first pin engages with the zero point notch, the second pin engages with the second notch. Only via correct engaging of the two pins with the two notches, the BNC could be locked and the drilling device could be activated for drilling.

BRIEF DESCRIPTION OF THE DRAWINGS

In the following, exemplary embodiments of the present invention will be specified for further explanation and for better understanding with reference to the attached drawings:

FIG. 1 shows a schematic view of an exemplary embodiment of a drilling bushing (upper part) and an associated drilling device (lower part);

FIG. 2 shows a second drilling bushing with an associated drilling device and

FIG. 3 shows a shows a schematic view of a further exemplary embodiment of the drilling device.

Similar or relating components in the several figures are provided with the same reference numerals. The view in the figures is schematic and not full scaled.

DETAILED DESCRIPTION OF THE PREFERRED EMBODIMENTS

FIG. 1 shows in its upper part an exemplary drilling bushing 1 as a first coding master device.

The drilling bushing 1 comprises a coding master device, in particular a bushing edge 2, which comprises a first locking element 5 with a first recess 3 and a second recess 4, wherein the second recess 4 is spaced to the first recess 3 along to the bushing edge in a predetermined angle 6 of 180 degrees.

In its lower part FIG. 1 shows partly an exemplary drilling device 7. The drilling device 7 comprises a coding sleeve device with a coding sleeve edge 8, wherein the coding sleeve edge comprises a second locking device 9 with a first coding pin 10 and a second coding pin 11, wherein the first and the second coding pin are spaced with the predetermined angle 6' of again 180 degrees.

The drilling device 8 and the drilling bushing 1 compose a set 12 wherein the first locking device is connectable to the second locking element, if the first coding pin 10 engages with the first recess 3 and the second coding pin 11 engages with the second recess 4.

FIG. 2 shows a second set 13 with a different angle 14, 14' between the pins/recesses.

FIG. 3 shows a third drilling device 15 with a drill 16. The drill has a diameter D of 47 mm.

The drilling device has also coding pins 17, 18 near the BNC flanges 19, 20.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

The invention claimed is:
1. A method for coding a drilling device for an aircraft, the method comprising:

placing a drilling template with at least a drilling hole on a work piece;

placing a drilling bushing in the drilling hole of the drilling template;

placing the drilling device in the drilling hole of the drilling template;

wherein the drilling bushing comprises a first locking device and a coding master device comprising a bushing edge comprising a first recess and a second recess;

wherein the drilling device comprises a second locking device and a coding sleeve device comprising a coding sleeve edge comprising a first coding pin and a second coding pin; and wherein the coding sleeve device engages with the coding master device when moving them axially towards each other such that the first coding pin engages with the first recess and the second coding pin engages with the second recess, the first and the second locking devices connectable to one another when the first and the second coding pins correspond to the first and the second recesses, respectively.

2. The method according to claim 1, wherein the second recess is spaced from the first recess along to the bushing edge in a predetermined angle, and wherein the first and the second coding pins are spaced with the predetermined angle.

3. The method according to claim 1, wherein the first and the second locking devices form a bayonet coupling.

4. The method according to claim 1, wherein the drilling device comprises a further coding sleeve device.

5. The method of claim 1, wherein the axial movement of the coding sleeve device and the coding master device toward one another achieves the coding.

6. A set comprising:
a drilling bushing comprising a first locking device and a coding master device comprising a bushing edge comprising a first recess and a second recess, the second recess being spaced from the first recess along the bushing edge in a predetermined angle, and a drilling device comprising a second locking device and a coding sleeve device comprising a coding sleeve edge comprising a first linear coding pin and a second linear coding pin which are spaced with the predetermined angle, wherein the coding sleeve device is adapted for engaging with the coding master device when axially moved towards each other such that the first coding pin engages with the first recess and the second coding pin engages with the second recess, the first and the second locking devices connectable to one another when the first and the second coding pins correspond to the first and the second recesses, respectively.

7. The set of claim 6, wherein the axial movement of the coding sleeve device and the coding master device toward one another achieves the coding.

* * * * *